(12) United States Patent
Lee et al.

(10) Patent No.: US 11,569,773 B2
(45) Date of Patent: Jan. 31, 2023

(54) APPARATUS AND METHOD OF CONTROLLING COMPRESSOR, AND AIR CONDITIONER INCLUDING THE SAME

(71) Applicant: SAMSUNG ELECTRONICS CO., LTD., Suwon-si (KR)

(72) Inventors: Taeho Lee, Suwon-si (KR); Junghyun Lee, Suwon-si (KR); Junghoon Lee, Suwon-si (KR); Yoonsup Kim, Suwon-si (KR); Youngjae Park, Suwon-si (KR); Jieun Ban, Suwon-si (KR); Jong-Hyun Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 360 days.

(21) Appl. No.: 16/922,419

(22) Filed: Jul. 7, 2020

(65) Prior Publication Data

US 2021/0013825 A1   Jan. 14, 2021

(30) Foreign Application Priority Data

Jul. 9, 2019   (KR) .......................... 10-2019-0082519

(51) Int. Cl.
| | | |
|---|---|---|
| *H02P 27/08* | (2006.01) | |
| *H02M 5/458* | (2006.01) | |
| *F04D 13/06* | (2006.01) | |

(52) U.S. Cl.
CPC .............. *H02P 27/08* (2013.01); *F04D 13/06* (2013.01); *H02M 5/458* (2013.01)

(58) Field of Classification Search
CPC .......... H02P 27/00; H02P 27/04; H02P 27/06; H02P 27/08; H02P 27/085; H02P 27/12; H02P 27/14; H02P 29/00; H02P 29/40; H02P 29/60; H02P 29/62; H02P 21/00; H02P 21/0003; H02P 21/14; H02P 21/22; H02P 21/34; H02P 23/00; H02P 23/0004; H02P 23/07; H02P 23/14; H02P 23/26; H02P 1/00; H02P 1/04; H02P 1/16; H02P 1/18; H02P 1/24; H02P 1/26; H02P 1/42;
(Continued)

(56) References Cited

FOREIGN PATENT DOCUMENTS

| JP | 2013201805 A | * 10/2013 | .............. H02P 27/06 |
|---|---|---|---|
| JP | 2018-186591 A | 11/2018 | |

(Continued)

*Primary Examiner* — Antony M Paul
(74) *Attorney, Agent, or Firm* — Staas & Halsey LLP

(57) ABSTRACT

A compressor control apparatus includes a rectifier configured to rectify AC power to DC power; an inverter including a plurality of switching elements, configured to convert the DC power into a three-phase voltage according to a pulse width modulation (PWM) signal applied to the plurality of switching elements; a motor configured to receive a three-phase current based on the three-phase voltage; a current detector configured to detect a sum of a first phase current, a second phase current, and a third phase current supplied to the motor; and a controller configured to differently determine a duty ratio of the PWM signal applied to each of the plurality of switching elements, and to determine the first phase current, the second phase current, and the third phase current, respectively, based on the determined duty ratio and the sum of the currents detected from the current detector.

20 Claims, 13 Drawing Sheets

(58) Field of Classification Search
CPC ...... H02P 1/46; H02P 3/00; H02P 6/00; H02P 6/12; H02P 6/28; H02P 7/29
See application file for complete search history.

(56) References Cited

FOREIGN PATENT DOCUMENTS

| | | |
|---|---|---|
| KR | 10-1449021 | 10/2014 |
| KR | 10-2018-0111783 A | 10/2018 |

\* cited by examiner

PRIOR ART

PRIOR ART

APPARATUS AND METHOD OF CONTROLLING COMPRESSOR, AND AIR CONDITIONER INCLUDING THE SAME

CROSS-REFERENCE TO RELATED APPLICATION(S)

This application is based on and claims priority under 35 U.S.C. § 119 to Korean Patent Application No. 10-2019-0082519, filed on Jul. 9, 2019 in the Korean Intellectual Property Office, the disclosure of which is incorporated by reference in its entirety.

TECHNICAL FIELD

The disclosure relates to an apparatus and a method of controlling a compressor, and an air conditioner including the same, and more particularly, to suppress high-frequency noise generated during a heating operation of a winding inside the compressor.

BACKGROUND

Oil is contained inside a compressor of an air conditioner, and the oil serves as a lubricant that prevents a rise in temperature due to friction inside the compressor and prevents adhesion of compression parts. Generally, an outdoor unit equipped with the compressor is installed outdoors. Therefore, when an outdoor temperature decreases due to factors such as climate change, a refrigerant contained in the compressor melts in the oil inside the compressor.

When the refrigerant is dissolved in the oil inside the compressor, foaming occurs when a motor of the compressor is operated. The occurrence of the foam increases the amount of oil discharged, which leads to poor lubrication of the compressor, and thus malfunction of the compressor.

SUMMARY

An aspect of the disclosure is to provide an apparatus for controlling a compressor capable of determining current flowing through each of a plurality of windings without generating high-frequency noise by controlling a vector phase of a three-phase voltage applied to a motor through a duty ratio control of a pulse width modulation (PWM) signal applied to a plurality of switching elements included in an inverter, a method of controlling the compressor, and an air conditioner including the same.

Additional aspects of the disclosure will be set forth in part in the description which follows and, in part, will be obvious from the description, or may be learned by practice of the disclosure.

In accordance with an aspect of the disclosure, a compressor control apparatus includes a rectifier configured to rectify AC power to DC power; an inverter including a plurality of switching elements, configured to convert the DC power into a three-phase voltage according to a pulse width modulation (PWM) signal applied to the plurality of switching elements; a motor configured to receive a three-phase current based on the three-phase voltage; a current detector configured to detect a sum of a first phase current, a second phase current, and a third phase current supplied to the motor; and a controller configured to differently determine a duty ratio of the PWM signal applied to each of the plurality of switching elements, and to determine the first phase current, the second phase current, and the third phase current, respectively, based on the determined duty ratio and the sum of the currents detected from the current detector.

The controller may be configured to determine the duty ratio of the PWM signal applied to each of the plurality of switching elements so that a vector of the three-phase voltage has a phase of $(30+60m)°$ (m is an integer).

The controller may be configured to change the integer m by changing the duty ratio of the PWM signal applied to each of the plurality of switching elements according to a predetermined time.

The plurality of switching elements may include a first phase switching element through which the first phase current can flow, a second phase switching element through which the second phase current can flow, and a third phase switching element through which the third phase current can flow. When the duty ratio of the PWM signal applied to the first phase switching element is greater than or less than the duty ratio of the PWM signal applied to each of the second phase switching element and the third phase switching element, the controller may be configured to advance or delay the PWM signal applied to the first phase switching element by a predetermined time within a predetermined period.

The controller may be configured to delay or advance the PWM signal applied to the first phase switching element within a next period of the predetermined period by the predetermined time When a size of the vector of the three-phase voltage is less than or equal to a predetermined size, the controller may be configured to change a pulse width of the PWM signal applied to each of the plurality of switching elements every predetermined period to add a voltage vector having a phase of $(30+60m)°$ to the vector of the three-phase voltage.

The controller may be configured to change the pulse width of the PWM signal applied to each of the plurality of switching elements to add a voltage vector having a phase of $(-30-60m)°$ to the vector of the three-phase voltage in a next period of the predetermined period.

In accordance with another aspect of the disclosure, a method of controlling a compressor including a current detector connected to a plurality of switching elements, the method includes determining a duty ratio of a pulse width modulation (PWM) signal applied to each of the plurality of switching elements differently; converting DC power into a three-phase voltage according to the PWM signal applied to the plurality of switching elements; detecting a sum of a first phase current, a second phase current, and a third phase current supplied to a motor; and determining the first phase current, the second phase current, and the third phase current, respectively, based on the determined duty ratio and the detected sum of the currents.

The determining of the duty ratio of the PWM signal applied to each of the plurality of switching elements differently may include determining the duty ratio of the PWM signal applied to each of the plurality of switching elements so that a vector of the three-phase voltage has a phase of $(30+60m)°$ (m is an integer).

The method may further include changing the integer m by changing the duty ratio of the PWM signal applied to each of the plurality of switching elements according to a predetermined time.

The method may further include advancing or delaying the PWM signal applied to a first phase switching element by a predetermined time within a predetermined period when the duty ratio of the PWM signal applied to the first phase switching element is greater than or less than the duty ratio of the PWM signal applied to each of a second phase switching element and a third phase switching element.

The method may further include delaying or advancing the PWM signal applied to the first phase switching element within a next period of the predetermined period by the predetermined time.

The method may further include changing a pulse width of the PWM signal applied to each of the plurality of switching elements every predetermined period to add a voltage vector having a phase of (30+60m)° to the vector of the three-phase voltage when a size of the vector of the three-phase voltage is less than or equal to a predetermined size.

The method may further include changing the pulse width of the PWM signal applied to each of the plurality of switching elements to add a voltage vector having a phase of (−30−60m)° to the vector of the three-phase voltage in a next period of the predetermined period.

In accordance with another aspect of the disclosure, an air conditioner includes a rectifier configured to rectify AC power to DC power; an inverter including a plurality of switching elements, configured to convert the DC power into a three-phase voltage according to a pulse width modulation (PWM) signal applied to the plurality of switching elements; a motor configured to receive a three-phase current based on the three-phase voltage; a current detector configured to detect a sum of a first phase current, a second phase current, and a third phase current supplied to the motor; and a controller configured to differently determine a duty ratio of the PWM signal applied to each of the plurality of switching elements, and to determine the first phase current, the second phase current, and the third phase current, respectively, based on the determined duty ratio and the sum of the currents detected from the current detector.

The controller may be configured to determine the duty ratio of the PWM signal applied to each of the plurality of switching elements so that a vector of the three-phase voltage has a phase of (30+60m)° (m is an integer).

The controller may be configured to change the integer m by changing the duty ratio of the PWM signal applied to each of the plurality of switching elements according to a predetermined time.

The plurality of switching elements may include a first phase switching element through which the first phase current can flow, a second phase switching element through which the second phase current can flow, and a third phase switching element through which the third phase current can flow. When the duty ratio of the PWM signal applied to the first phase switching element is greater than or less than the duty ratio of the PWM signal applied to each of the second phase switching element and the third phase switching element, the controller may be configured to advance or delay the PWM signal applied to the first phase switching element by a predetermined time within a predetermined period.

The controller may be configured to delay or advance the PWM signal applied to the first phase switching element within a next period of the predetermined period by the predetermined time.

When a size of the vector of the three-phase voltage is less than or equal to a predetermined size, the controller may be configured to change a pulse width of the PWM signal applied to each of the plurality of switching elements every predetermined period to add a voltage vector having a phase of (30+60m)° to the vector of the three-phase voltage.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
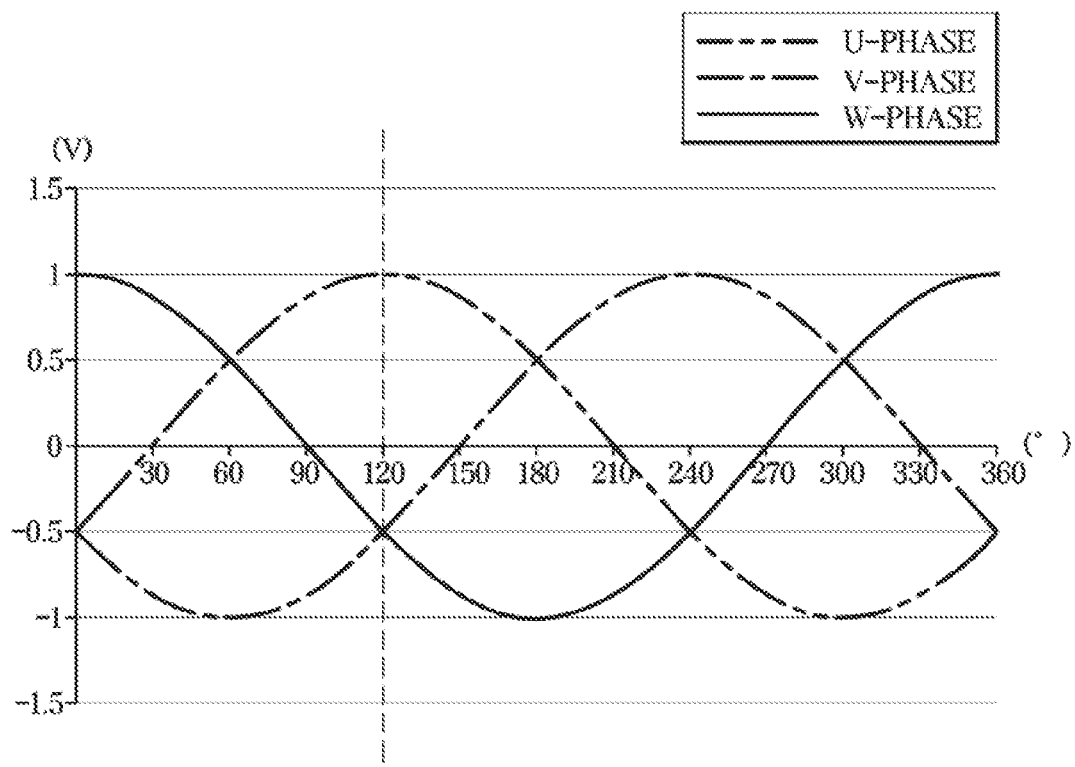
FIG. 1 is a view illustrating a specific phase of a three-phase voltage vector of a compressor control apparatus and a current flow according to a prior art.
Figure 1:
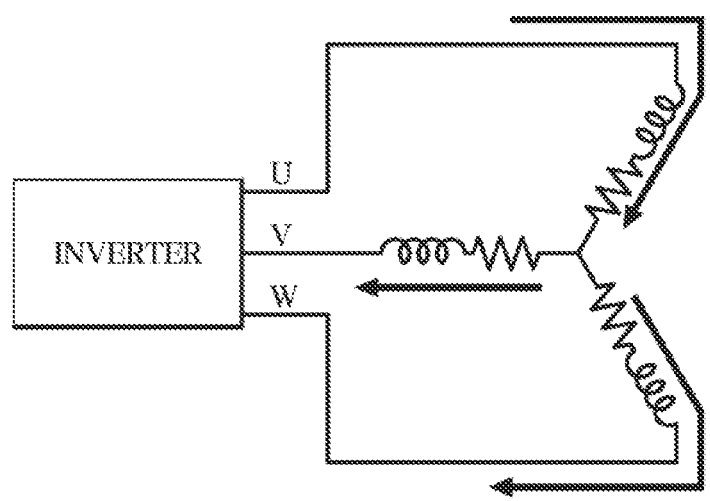

The following description is merely exemplary in nature and is not intended to limit the present disclosure, application, or uses. It should be understood that throughout the drawings, corresponding reference numerals indicate like or corresponding parts and features.

Throughout this specification, when a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that can be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Hereinafter, the embodiments will be described in detail with reference to the accompanying drawings. In addition, parts irrelevant to the description are omitted in the drawings in order to clearly explain some forms of the present disclosure.

In the disclosed specification, the term "voltage vector of a three-phase voltage" may refer to a vector that sums average values of voltage vectors applied to each of a U-phase, a V-phase, and a W-phase. In this case, it can be determined that the voltage vector applied to the U-phase has a phase of 0°, the voltage vector applied to the V-phase has a phase of 120°, and the voltage vector applied to the W-phase has a phase of 240°. However, it is not limited thereto. That is, when determining the voltage vector of the three-phase voltage, a reference may be determined such that the U-phase, the V-phase, and the W-phase each have a phase difference of 120°.

In the disclosed specification, the terms "one-phase," "two-phase," and "three-phase" may refer to each phase of the three-phase voltage. That is, the one-phase may refer to the U-phase, the two-phase may refer to the V-phase, and the three-phase may refer to the W-phase, but is not limited thereto.

In the disclosed specification, the term "pulse width modulation (PWM) signal" may refer to a signal for turning on/off a plurality of switching elements included in an inverter. The PWM control may refer to controlling a voltage or a current applied to a phase to which each of the switching elements is connected by controlling an on/off ratio of each of the switching elements.

In the disclosed specification, the term "duty ratio of the PWM signal" may refer to an interval ratio of a high signal within one period. That is, when the duty ratio of the PWM signal is large, it may refer to that a pulse width within one period is large.

All components included in a "compressor control apparatus" in the disclosed specification may be included in an air conditioner. The "air conditioner" may refer to any apparatus that sucks in air to blow air conditioning.

In the case of the prior art, in order to solve a foaming phenomenon of the compressor, a method of heating oil using heat generated by flowing a current in a motor winding inside the compressor at low temperature to separate a refrigerant from the oil and reducing the viscosity of the oil is used.

In the case of winding heating, since a rotation of the compressor should not occur, a method of generating heat in the winding is used by applying a direct current to a plurality of the windings through a specific phase of a three-phase voltage. In addition, a single current detector commonly connected to the plurality of windings is used to measure the current flowing inside a compressor motor.

However, when the specific phase of the three-phase voltage is used through the PWM control, it is impossible to individually determine the current flowing through each of the plurality of windings based on the current detected by the single current detector. Therefore, in order to individually determine the current flowing through each of the plurality of windings, a method of injecting a compensation voltage to the specific phase among the three-phase voltages was used. When the compensation voltage is injected into the specific phase, a frequency component other than a carrier frequency of the PWM occurs and there is a problem that causes audible noise. Hereinafter, problems of the prior art will be described in detail with reference to FIGS. 1 and 2.

Figure 2:
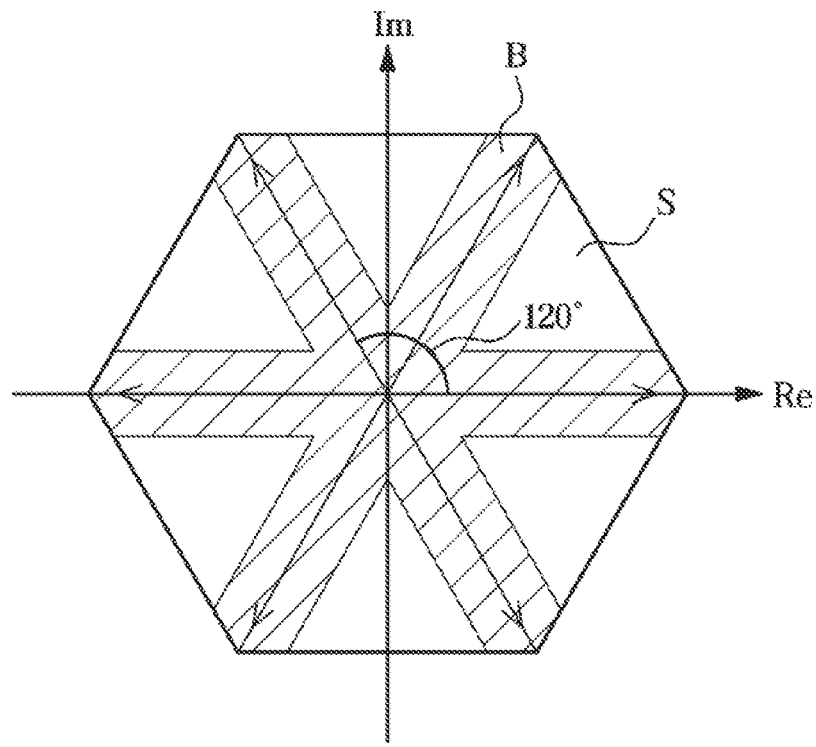
FIG. 2 is a view illustrating a PWM signal applied to each switching element of a compressor control apparatus according to a prior art.
Figure 2:
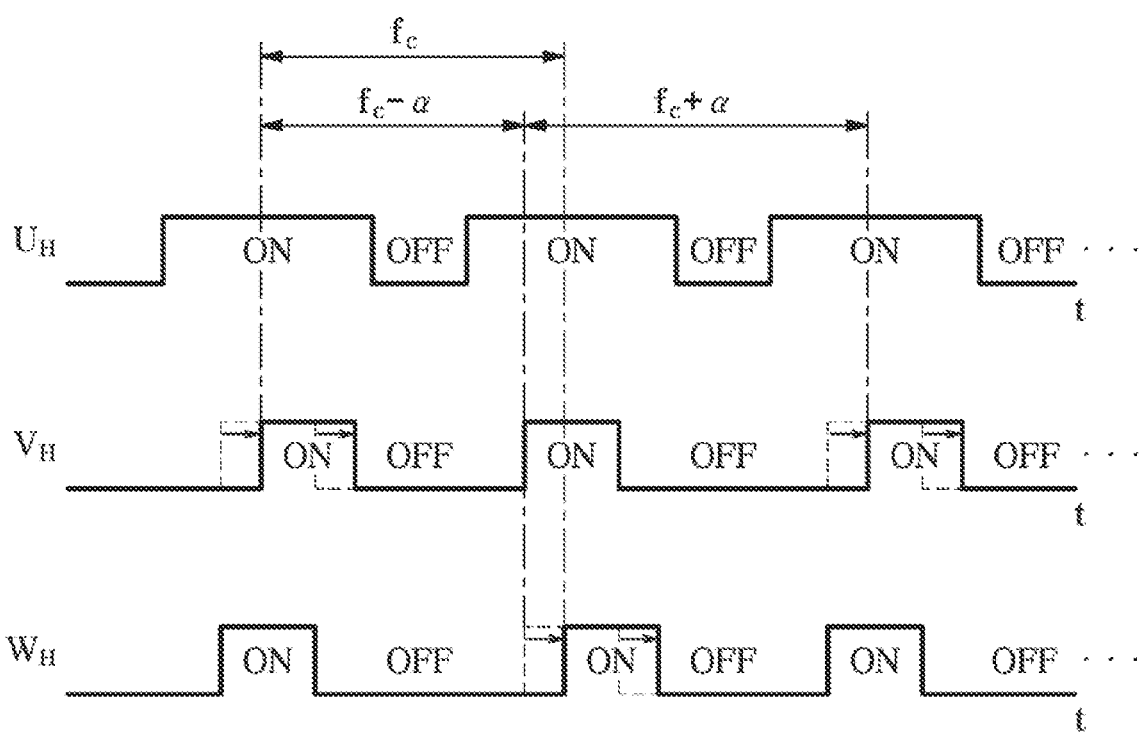

FIG. 1 is a view illustrating a specific phase of a three-phase voltage vector of a compressor control apparatus and a current flow according to a prior art, and FIG. 2 is a view illustrating a PWM signal applied to each switching element of a compressor control apparatus according to a prior art. In order to avoid overlapping descriptions, the following description will be given.

Referring to FIG. 1, a conventional compressor control apparatus may control an inverter such that a vector of a three-phase voltage applied to a plurality of windings included in a motor has a phase of 120°. The inverter included in the conventional compressor control apparatus includes a plurality of switching elements, and a controller included in the conventional compressor control apparatus may control a duty ratio of a PWM signal applied to the plurality of switching elements so that the vector of the three-phase voltage has the phase of 120°.

For example, when the vector of the three-phase voltage applied to the plurality of windings is 120°, the voltage to be applied to a U-phase is 1V, the voltage to be applied to a V-phase is −0.5V, and the voltage to be applied to a W-phase is −0.5V. At this time, the duty ratio of the PWM signal applied to the switching element corresponding to the U-phase (hereinafter referred to as 'U-phase switching element') of the three phases may be about 70%, and the duty ratio of the PWM signal applied to the switching element corresponding to the V-phase and the W-phase (hereinafter referred to as 'V-phase switching element' and 'W-phase switching element') may be about 40%, respectively. Since the duty ratio may be changed according to other factors such as a size of the voltage vector of the three-phase voltage, it should be understood that the illustrated duty ratio is merely an example for describing the disclosed disclosure.

That is, when the vector of the three-phase voltage is 120°, the duty ratio of the PWM signal applied to the U-phase switching element is greater than the duty ratio of the PWM signal applied to the V-phase switching element and the W-phase switching element. The duty ratio of the PWM signal applied to the V-phase switching element and the W-phase switching element becomes almost the same.

Therefore, according to the prior art, the current flows through the winding connected to the U-phase switching element (hereinafter referred to as 'U-phase winding') to the winding connected to the V-phase switching element (hereinafter referred to as 'V-phase winding') and the winding connected to the W-phase switching element (hereinafter referred to as 'W-phase winding'). That is, the current flows through all of the U-phase winding, the V-phase winding, and the W-phase winding.

Conventionally, in order to detect the current flowing through each of the U-phase winding, V-phase winding and W-phase winding, current detectors are installed on all of the U-phase winding, the current detectors are installed in two phases such as the U-phase winding and the V-phase winding, or the V-phase winding and the W-phase winding to detect the current flowing through each of the windings. However, recently, in order to minimize the cost of installing a plurality of the current detectors, a method of detecting the current flowing in common to the plurality of windings by installing the single current detector (single shunt) common to all of the plurality of windings, and determining the current flowing through each of the plurality of windings based on the detected current was used (hereinafter referred to as 'single shunt method').

Referring to FIG. 2, in the case of using the single shunt method, it is possible to identify a current undetectable area B that cannot determine the current flowing through each of the U-phase winding, the V-phase winding, and the W-phase winding according to the voltage vector of the three-phase voltage, and a current detectable area S that can determine the current flowing through each of the U-phase winding, the V-phase winding, and the W-phase winding.

The compressor control apparatus according to the prior art may control the duty ratio of the PWM signal applied to the plurality of switching elements so that the voltage vector of the three-phase voltage has the phase of 120° (or 60° intervals based on the phase of 120°) when heating the winding for preheating the compressor. In order to detect the current flowing through each of the plurality of windings, by artificially moving the phase of one of the two phases receiving the PWM signal of the same duty ratio, a section capable of detecting the current was artificially made.

That is, in order to detect the current flowing through each of the plurality of windings, a measurement vector, which is the voltage vector for measuring the current, was injected to move the voltage vector of the three-phase voltage to the current detectable area S, and a compensation vector, which is the voltage vector for compensating the current, was injected to adjust an output of the PWM signal to be constant.

Particularly, referring to FIG. 2, as described above, the duty ratio of the PWM signal applied to the U-phase switching element may be about 70%, and the duty ratio of the PWM signal applied to the V-phase switching element and the W-phase switching element may be about 40%. At this time, on/off timing of the V-phase switching element and on/off timing of the W-phase switching element are almost the same. Therefore, in order to secure a time for detecting the current flowing through each of the plurality of switching elements, output timings of the PWM signals applied to the V-phase or the W-phase may be moved so that the on/off timings of the V-phase switching element and the W-phase switching element are different.

When the output timing of the PWM signal is moved for current detection, the PWM signal output to the plurality of switching elements may not only have a carrier frequency fc, but may also have a frequency fc+a as large as a predetermined value around the carrier frequency fc.

The PWM signal output to the plurality of switching elements may have a frequency fc−a as small as the predetermined value around the carrier frequency fc.

In addition, when the frequencies generated at this time (fc+a, fc−a) are present in an audible frequency band, audible noise is caused.

Hereinafter, the compressor control apparatus or an air conditioner including the same will be described with reference to FIGS. 3 to 13 according to an embodiment of solving the problems of the prior art.

Figure 3:
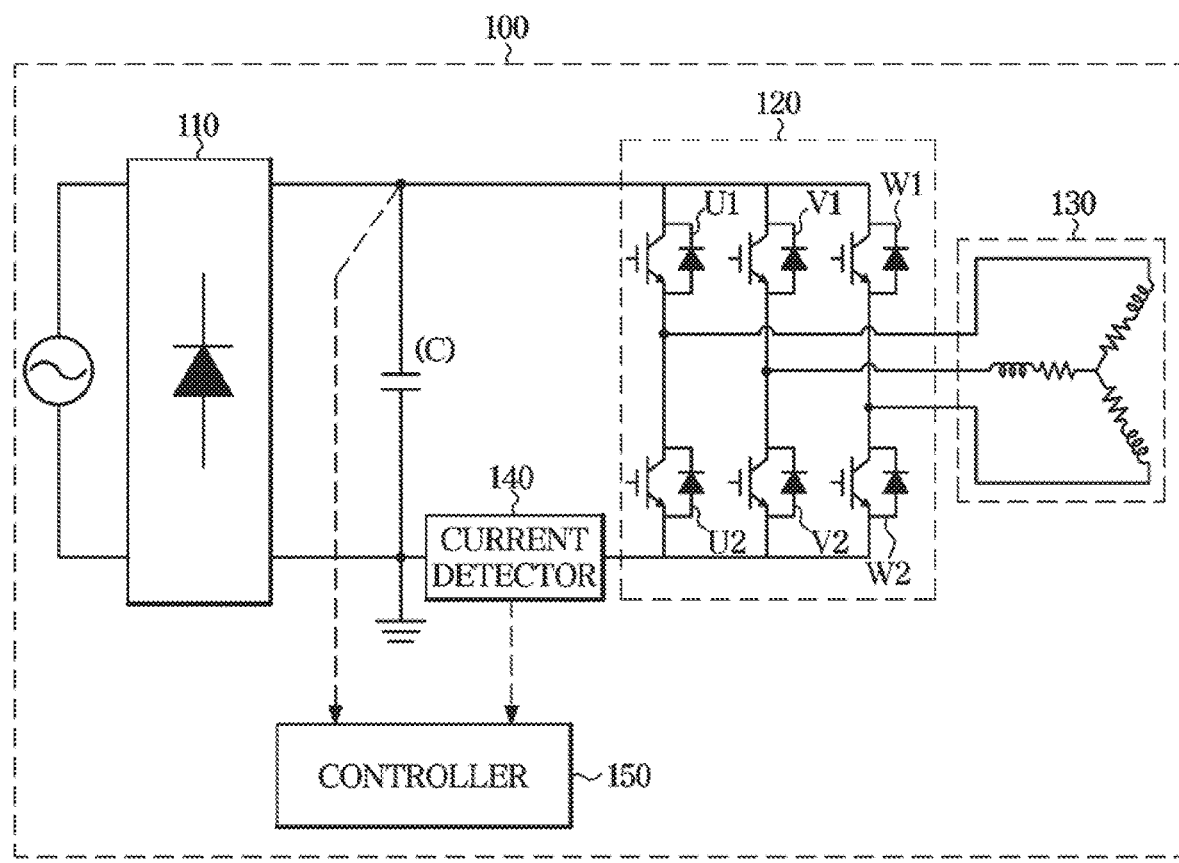
FIG. 3 is a view illustrating a circuit configuration of a compressor control apparatus according to an embodiment.

FIG. 3 is a view illustrating a circuit configuration of a compressor control apparatus according to an embodiment.

Referring to FIG. 3, an air conditioner 10 may include a compressor control apparatus 100. The compressor control apparatus 100 according to the embodiment may include a rectifier 110 for rectifying AC power to DC power, an inverter 120 that includes a plurality of switching elements U1, V1, W1, U2, V2, and W2 and converts the rectified DC power into the three-phase voltage according to the PWM signal applied to the plurality of switching elements U1, V1, W1, U2, V2, and W2, a motor 130 that receives a three-phase current based on the converted three-phase voltage, a single current detector 140 that is commonly connected to the plurality of switching elements U1, V1, W1, U2, V2, and W2 to detect the sum of a first phase current, a second phase current, and a third phase current supplied to the motor 130, and a controller 150 that determines the duty ratio of the PWM signal applied to each of the plurality of switching elements U1, V1, W1, U2, V2, and W2 differently and determines the first phase current, the second phase current, and the third phase current, respectively, based on the determined sum of each of the duty ratios and the currents detected by the current detector 140.

The rectifier 110 may rectify the AC power to generate the DC power, and may smooth the rectified DC power from a capacitor C to supply the DC power to the plurality of switching elements U1, V1, W1, U2, V2, and W2. Particularly, the rectifier 110 may apply the DC power to a collector (or drain) stage of the upper switching elements U1, V1, and W1. The rectifier 110 may include a rectifier circuit using a bridge diode.

The inverter 120 may include the plurality of switching elements U1, V1, W1, U2, V2, and W2 for converting the supplied DC power to the three-phase voltage. The plurality of switching elements U1, V1, W1, U2, V2, and W2 may include the first switching element U1, the second switching element V1, and the third switching element W1 provided on an upper side and connected in series with each other. In addition, the plurality of switching elements U1, V1, W1, U2, V2, and W2 may include the fourth switching element U2, the fifth switching element V2, and the sixth switching element W2 connected to a lower side in parallel with each of the upper switching elements U1, V1, and W1, and connected in series with each other.

At this time, the first switching element U1 and the fourth switching element U2 may be a U-phase upper switching element and a U-phase lower switching element for adjusting the voltage supplied to the U-phase, respectively. The second switching element V1 and the fifth switching element V2 may be a V-phase upper switching element and a V-phase lower switching element for adjusting the voltage supplied to the V-phase, respectively. The third switching element W1 and the sixth switching element W2 may be a W-phase upper switching element and a W-phase lower switching element for adjusting the voltage supplied to the W phase, respectively.

For convenience of description below, the first phase switching elements U1 and U2 are described as including the U-phase upper switching element and the U-phase lower switching element. The second phase switching elements V1 and V2 are described as including the V-phase upper switching element and the V-phase lower switching element. The third phase switching elements W1 and W2 are described as including the W-phase upper switching element and the W-phase lower switching element. That is, the first phase switching elements U1 and U2 may refer to switching elements through which the first phase current can flow, and the second phase switching elements V1 and V2 may refer to switching elements through which the second phase current can flow, and the third phase switching elements W1 and W2 may refer to switching elements through which the third phase current can flow.

The controller 150 controls the duty ratio of the PWM signal so that the lower switching element U2 is turned off when the upper switching element U1 included in the first phase switching elements U1 and U2 is turned on. In other words, the upper switching element U1 and the lower switching element U2 included in the first phase switching elements U1 and U2 may be complementary to each other. That is, the controller 150 may control the duty ratio of the PWM signal so that the lower switching element U2 is turned off when the upper switching element U1 included in the first phase switching elements U1 and U2 is in an on state. The controller 150 may control the duty ratio of the PWM signal so that the lower switching element U2 is turned off when the upper switching element U1 included in the first phase switching elements U1 and U2 is in an off state. This is also the case for the upper switching element V1 and the lower switching element V2 included in the second phase switching elements V1 and V2, and the upper switching element W1 and the lower switching element W2 included in the third phase switching elements W1 and W2.

Therefore, for convenience of description below, determining the duty ratio of the PWM signal applied to the plurality of switching elements U1, V1, W1, U2, V2, and W2 may refer to determining the duty ratio of the PWM signal applied to each of the upper switching element U1 of the first phase switching element, the upper switching element V1 of the second phase switching element, and the upper switching element W1 of the third phase switching element.

Here, the plurality of switching elements U1, V1, W1, U2, V2, and W2 may use a power transistor. For example, an insulated gate bipolar mode transistor (IGBT) may be used. The IGBT is a switching element having a structure of a power metal oxide semi-conductor field effect transistor (MOSFET) and a bipolar transistor, and is an element capable of low driving power, high speed switching, high withstand voltage, and high current density.

The motor 130 may receive the three-phase current based on the three-phase voltage converted by the inverter 120. Particularly, the three-phase current may include the first phase current flowing through the first phase switching elements U1 and U2, the second phase current flowing through the second phase switching elements V1 and V2, and the third phase current flowing through the third phase switching elements W1 and W2. That is, the motor 130 may be composed of a stator and a rotor, and the stator may include a one-phase winding through which the first phase current flows, a two-phase winding through which the second phase current flows, and a three-phase winding through which the third phase current flows. Each of the windings may include, for example, copper or aluminum. When the current flows through each of the windings, heat may be generated as much as a resistance value of the winding multiplied by a square of the current. That is, when the current output to each of the windings is increased, the heat generated in each of the windings also increases, so that the heat can be used to heat the compressor.

At this time, the motor 130 may be the compressor motor that drives the air conditioner 10, but is not limited thereto. That is, the motor 130 may be various application products using the three-phase current, for example, the compressor motor of a refrigerator.

The current detector 140 is connected to the plurality of switching elements U1, V1, W1, U2, V2, and W2 to detect the sum of the first phase current, the second phase current and the third phase current supplied from the motor 130. In other words, the current detector 140 may not be connected to each of the first phase switching elements U1 and U2, the second phase switching elements V1 and V2, and the third phase switching elements W1 and W2 to detect the current flowing in each phase, but is connected to all of the first phase switching elements U1 or U2, the second phase switching elements V1 or V2, and the third phase switching elements W1 or W2 to detect the sum of the first phase current, the second phase current, and the third phase current.

Although not illustrated in the drawing, the current detector 140 may include a current transformer (CT), a shunt resistance, and the like for current detecting.

The controller 150 may determine the duty ratio of the PWM signal applied to each of the plurality of switching elements U1, V1, W1, U2, V2, and W2 differently, and may determine the first phase current, the second phase current, and the third phase current, respectively, based on the determined duty ratio and the sum of the currents detected by the current detector 140. Particularly, the controller 150 may determine the duty ratio of the PWM signal applied to each of the plurality of switching elements U1, V1, W1, U2, V2, and W2 differently so that the vector of the three-phase voltage has a phase excluding 60n° (n is an integer).

When the vector of the three-phase voltage is 60°, the first phase switching element U1 corresponding to the U-phase and the third phase switching element W1 corresponding to the W-phase may be turned on/off by the PWM signal having almost the same duty ratio. As described above, when the vector of the three-phase voltage is 120°, the second phase switching element V1 and the third phase switching element W1 may be turned on/off by the PWM signal having almost the same duty ratio. In other words, when the voltage vector of the three-phase voltage is 60n° (n is the integer), at least two of the switching elements U1 and V1, U1 and W1, or V1 and W1 of the first phase switching element U1, the second phase switching element V1, and the third phase switching element W1 may be turned on/off by the PWM signal having the same duty ratio.

Therefore, the controller 150 may determine the duty ratio of the PWM signal applied to each of the plurality of switching elements U1, V1, W1, U2, V2, and W2 differently so that the voltage vector of the three-phase voltage has the phase excluding 60n° (n is the integer). For example, the controller 150 may determine the duty ratio of the PWM signal applied to the first phase switching element U1 to be about 50%, the duty ratio of the PWM signal applied to the second phase switching element V1 to be about 40%, and the duty ratio of the PWM signal applied to the third phase switching element W1 to be about 60%.

When the voltage vector of the three-phase voltage has a phase other than 60n° (n is the integer), since all of the plurality of switching elements U1, V1, W1, U2, V2, and W2 are turned on/off by the PWM signals having different duty ratios, a time for detecting the current flowing in each phase may be secured. Therefore, it is unnecessary to move the PWM signal output timings for current detection, and it is possible to suppress generation of high frequency noise due to the PWM signal output timings movement. This will be described later in detail with reference to FIGS. 4 and 5.

The controller 150 may determine the first phase current, the second phase current, and the third phase current, respectively, based on the sum of the currents detected from the current detector 140 and the duty ratio of the PWM signal applied to each of the plurality of switching elements U1, V1, W1, U2, V2, and W2. In other words, the controller 150 may respectively determine the three-phase currents output from the motor 130 using the single current detector 140 commonly connected to the plurality of switching elements U1, V1, W1, U2, V2, and W2.

The controller 150 may be implemented with a memory storing an algorithm to control an operation of the components in the compressor control apparatus 100 or data about a program that implements the algorithm, and a processor carrying out the aforementioned operation using the data stored in the memory. The memory and the processor may be implemented in separate chips. Alternatively, the memory and the processor may be implemented in a single chip.

The compressor control apparatus 100 may include a gate driver that outputs the PWM signal to gate terminals of the plurality of switching elements U1, V1, W1, U2, V2, and W2. The gate driver may output the PWM signal to the gate terminals of the plurality of switching elements U1, V1, W1, U2, V2, and W2 according to the duty ratio of the PWM signal determined by the controller 150, so that each of the plurality of switching elements U1, V1, W1, U2, V2, and W2 can be turned on/off. The controller 150 may be configured to include the gate driver.

As described above, all configurations of the compressor control apparatus 100 according to the embodiment described with reference to FIG. 3 may be one configuration of the air conditioner 10 according to the embodiment.

Hereinafter, the PWM signal applied to each of the switching elements U1, V1, and W1 when the vector of the three-phase voltage has a phase of (30+60m)° (m is an integer) will be described with reference to FIGS. 4 and 5.

Figure 4:
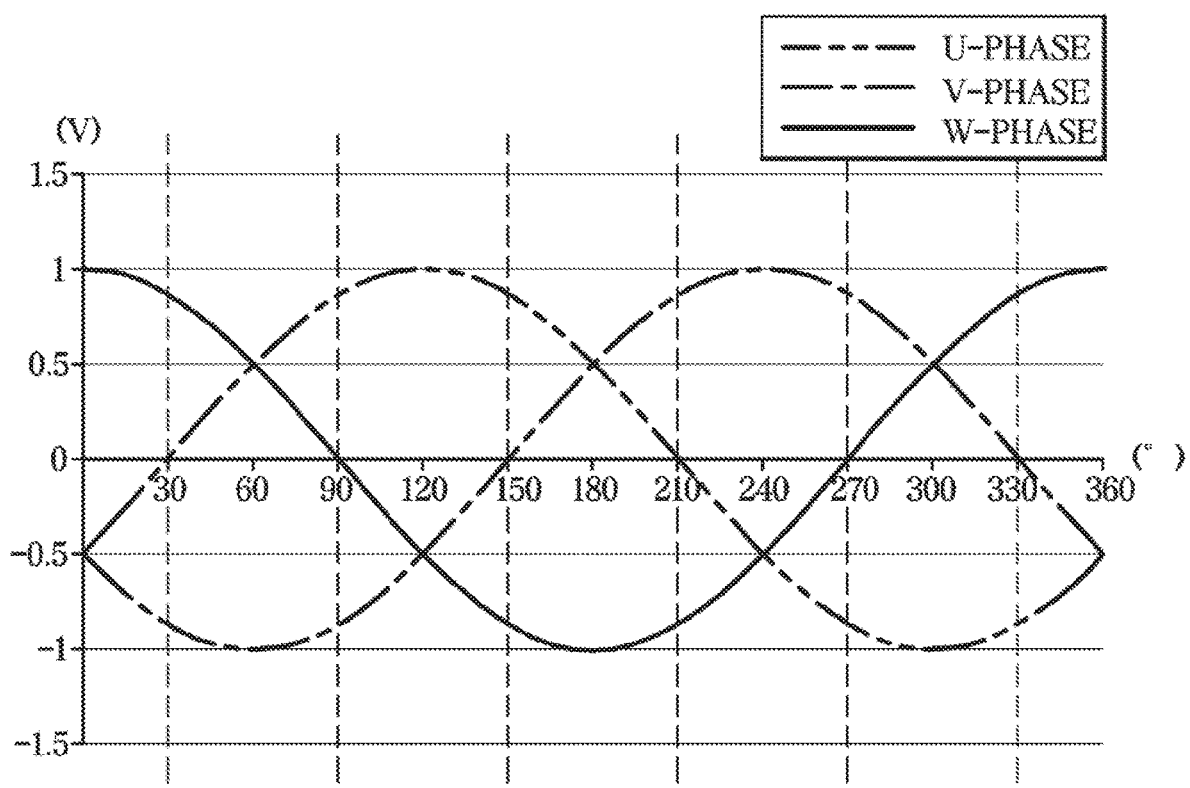
FIGS. 4 and 5 are views illustrating a phase of a three-phase voltage vector of a compressor control apparatus and a PWM signal applied to each switching element according to an embodiment.
Figure 4:
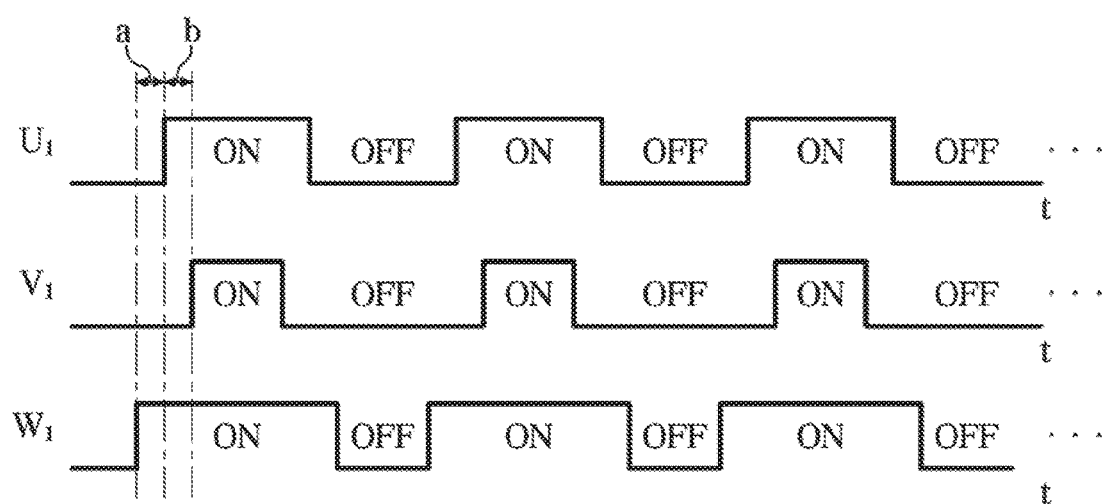
Figure 5:
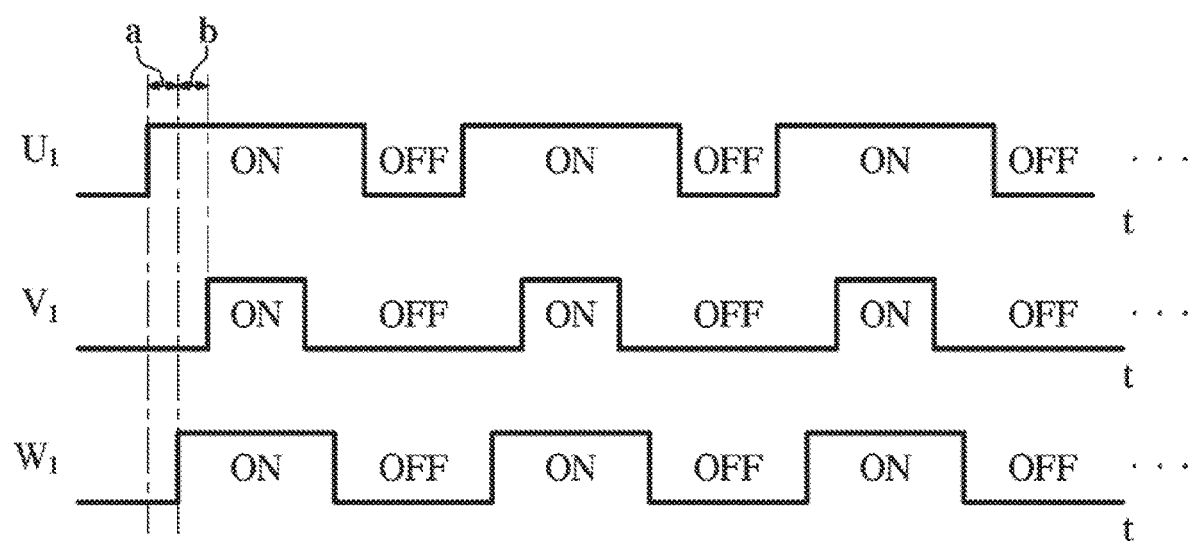

FIGS. 4 and 5 are views illustrating a phase of a three-phase voltage vector of a compressor control apparatus and a PWM signal applied to each switching element according to an embodiment.

Particularly, FIG. 4 is a view illustrating the PWM signal applied to each of the switching elements U1, V1, and W1 when the vector of the three-phase voltage has a phase of 30° according to the embodiment, and FIG. 5 is a view illustrating the PWM signal applied to each of the switching elements U1, V1, and W1 when the vector of the three-phase voltage has a phase of 90° according to the embodiment.

Referring to FIG. 4, the controller 150 may determine the duty ratio of the PWM signal applied to each of the plurality of switching elements U1, V1, W1, U2, V2, and W2 so that the vector of the three-phase voltage has the phase of (30+60m)° (m is the integer). Particularly, the controller 150 may determine the duty ratio of the PWM signal applied to each of the plurality of switching elements U1, V1, W1, U2, V2, and W2 so that the vector of the three-phase voltage has the phase of 30°.

When the vector of the three-phase voltage has the phase of 30°, the difference between the V-phase voltage and the U-phase voltage may be the same as the difference between the U-phase voltage and the W-phase voltage, and the difference between the V-phase voltage and the W-phase voltage may be twice the difference between the U-phase voltage and the W-phase voltage. In other words, the V-phase and the W-phase may have negative and positive voltage values that are spaced apart at regular intervals based on the U-phase. That is, the controller 150 may determine the duty ratio of the PWM signal applied to the third phase switching element W1 to be the largest, the duty ratio of the PWM signal applied to the second phase switching element V1 to be the smallest, and the duty ratio of the PWM signal applied to the first phase switching element U1 to be mid-sized.

For example, the duty ratio of the PWM signal applied to the first phase switching element U1 may be determined to be about 50%, the duty ratio of the PWM signal applied to the second phase switching element V1 may be determined to be about 35%, and the duty ratio of the PWM signal applied to the third phase switching element W1 may be determined to be about 65%. At this time, according to the duty ratio difference of each PWM signal, within one period, only the third phase switching element W1 is turned on (a), the first phase switching element U1 and the third phase switching element W1 are turned on (b), and all of the first phase switching element U1 to the third phase switching element W1 are turned on.

Therefore, the controller 150 may determine the first phase current, the second phase current, and the third phase current, respectively, based on the sum of the currents detected from the current detector 140 in each state. That is, the current flowing in each phase may be determined based on the duty ratio of the PWM signal applied to each of the plurality of switching elements U1, V1, and W1 and the sum of the currents detected from the current detector 140.

In this case, since there is no need to advance or delay the PWM signal output timing applied to each of the plurality of switching elements U1, V1, W1, U2, V2, and W2 to determine the current flowing in each phase, it is possible to suppress the generation of high-frequency noise caused by moving the output timings of the PWM signal.

Referring to FIG. 5, the controller 150 may determine the duty ratio of the PWM signal applied to each of the plurality of switching elements U1, V1, W1, U2, V2, and W2 so that the vector of the three-phase voltage has the phase of (30+60m)° (m is the integer). Particularly, the controller 150 may determine the duty ratio of the PWM signal applied to each of the plurality of switching elements U1, V1, W1, U2, V2, and W2 so that the vector of the three-phase voltage has the phase of 90°.

When the vector of the three-phase voltage has the phase of 90°, the difference between the U-phase voltage and the W-phase voltage may be the same as the difference between the W-phase voltage and the V-phase voltage, and the difference between the U-phase voltage and the V-phase voltage may be twice the difference between the V-phase voltage and the W-phase voltage. In other words, the U-phase and the V-phase may have negative and positive voltage values that are spaced apart at regular intervals based on the W-phase. That is, the controller 150 may determine the duty ratio of the PWM signal applied to the first phase switching element U1 to be the largest, the duty ratio of the PWM signal applied to the second phase switching element V1 to be the smallest, and the duty ratio of the PWM signal applied to the third phase switching element W1 to be mid-sized.

For example, the duty ratio of the PWM signal applied to the third phase switching element W1 may be determined to be about 50%, the duty ratio of the PWM signal applied to the second phase switching element V1 may be determined to be about 35%, and the duty ratio of the PWM signal applied to the first phase switching element U1 may be determined to be about 65%. At this time, according to the duty ratio difference of each PWM signal, within one period, only the first phase switching element U1 is turned on (a), the first phase switching element U1 and the third phase switching element W1 are turned on (b), and all of the first phase switching element U1 to the third phase switching element W1 are turned on.

Therefore, the controller 150 may determine the first phase current, the second phase current, and the third phase current, respectively, based on the sum of the currents detected from the current detector 140 in each state. That is, the current flowing in each phase may be determined based on the duty ratio of the PWM signal applied to each of the plurality of switching elements U1, V1, and W1 and the sum of the currents detected from the current detector 140.

In this case, since there is no need to advance or delay the PWM signal output timing applied to each of the plurality of switching elements U1, V1, W1, U2, V2, and W2 to determine the current flowing in each phase, it is possible to suppress the generation of high-frequency noise caused by moving the output timings of the PWM signal.

Hereinafter, a method of determining the current when the phase of the three-phase voltage vector is about 50° will be described with reference to FIG. 6.

Figure 6:
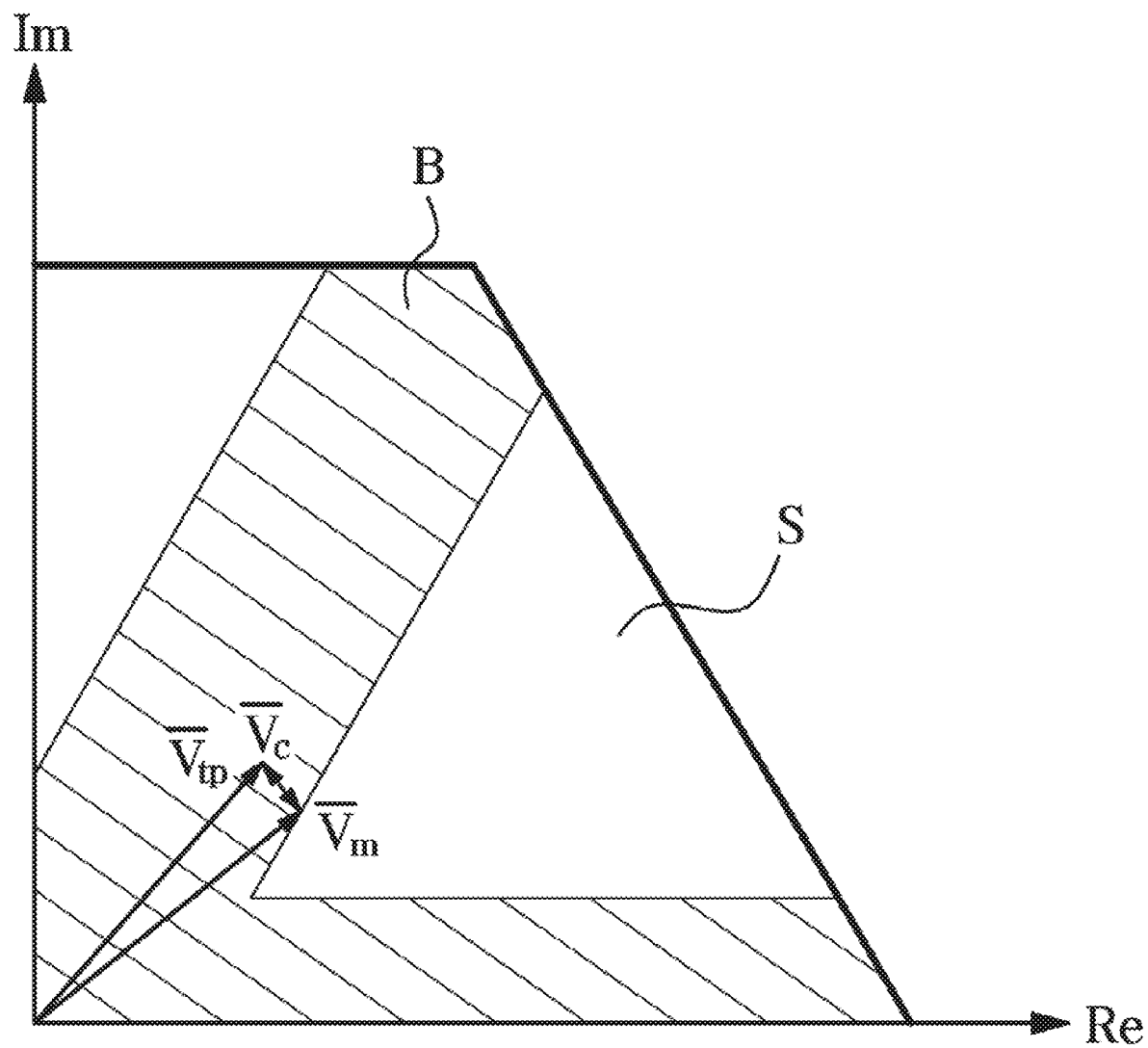
FIG. 6 is a view for describing a vector of a three-phase voltage of a compressor control apparatus, a compensation vector and a measurement vector according to an embodiment.

FIG. 6 is a view for describing a vector of a three-phase voltage of a compressor control apparatus, a compensation vector and a measurement vector according to an embodiment.

Referring to FIG. 6, the controller 150 may determine the duty ratio of the PWM signal applied to each of the plurality of switching elements U1, V1, W1, U2, V2, and W2 so that the vector of the three-phase voltage has a phase of about 50° excluding 60° (n is the integer). In this case, the difference between the W-phase voltage and the U-phase voltage may be much smaller than the difference between the W-phase voltage and the V-phase voltage.

That is, the controller 150 may determine the duty ratio of the PWM signal applied to the third phase switching element W1 to be the largest, the duty ratio of the PWM signal applied to the first phase switching element U1 to be slightly smaller than the duty ratio of the PWM signal applied to the third phase switching element W1, and the duty ratio of the PWM signal applied to the second phase switching element V1 to be much smaller than the duty ratio of the PWM signal applied to the first phase switching element U1

For example, the controller 150 may determine the duty ratio of the PWM signal applied to the first phase switching element U1 to be about 50%, the duty ratio of the PWM signal applied to the second phase switching element V1 to be about 30%, and the duty ratio of the PWM signal applied to the third phase switching element W1 to be about 60%.

At this time, according to the duty ratio difference of each PWM signal, within one period, only the third phase switching element W1 is turned on (a), the first phase switching element U1 and the third phase switching element W1 are turned on (b), and all of the first phase switching element U1 to the third phase switching element W1 are turned on. However, since the duty ratio of the PWM signal applied to the third phase switching element W1 and the duty ratio of the PWM signal applied to the first phase switching element U1 are only 5% different, the state where only the third phase switching element W1 is turned on may be maintained for a very short time.

Therefore, the controller 150 may not determine the first phase current, the second phase current, and the third phase current, respectively. That is, when only the third phase switching element W1 is turned on, the current detector 140 may not secure time to detect the current.

In this case, the controller 150 may advance or delay the PWM signal applied to the third phase switching element W1 by the predetermined time within a predetermined period. For example, the controller 150 may increase the time that only the third phase switching element W1 is turned on by advancing or delaying the PWM signal applied to the third phase switching element W1 by the predetermined time within an odd numbered period, such as a first period, a third period, and a fifth period. That is, the controller 150 may inject a voltage vector Vm or inject the current so that a three-phase voltage vector Vtp is included in the current detectable area S.

Thereafter, the controller 150 may determine the first phase current, the second phase current, and the third phase current, respectively, based on the sum of the currents detected by the current detector 140, and may delay or advance the PWM signal applied to the third phase switching element W1 by the predetermined time within a next period of the predetermined period so that the output of the PWM signal applied to the third phase switching element W1 is maintained.

For example, when the time for maintaining that the on state of only the third phase switching element W1 is increased by advancing or delaying the PWM signal applied to the third phase switching element W1 by the predetermined time within the odd numbered period such as the first period, the third period, and the fifth period, the controller 150 may control the output of the PWM signal applied to the third phase switching element W1 to be maintained by delaying or advancing the PWM signal applied to the third phase switching element W1 by the predetermined time within an even numbered period, such as a second period, a fourth period, and a sixth period. That is, the controller 150 may add a compensation voltage vector Vc so that the output of the PWM signal is maintained.

In summary, when there are the two phases having little difference in the duty ratio of the PWM signal, the controller 150 may advance or delay the PWM signal applied to the switching element having the largest duty phase, and may advance or delay the PWM signal applied to the switching element having the smallest duty phase.

That is, when the duty ratio of the PWM signal applied to the first phase switching element U1 is greater than or less than the duty ratio of the PWM signal applied to each of the second phase switching element V1 and the third phase switching element W1, the controller 150 may advance or delay the PWM signal applied to the first phase switching element U1 by the predetermined time within the predetermined period.

In addition, the controller 150 may delay or advance the PWM signal applied to the first phase switching element U1 by the predetermined time in the next period of the predetermined period.

Hereinafter, a method of determining the current when the phase of the three-phase voltage vector is (30+60m)° (m is the integer) will be described with reference to FIGS. 7 and 8.

Figure 7:
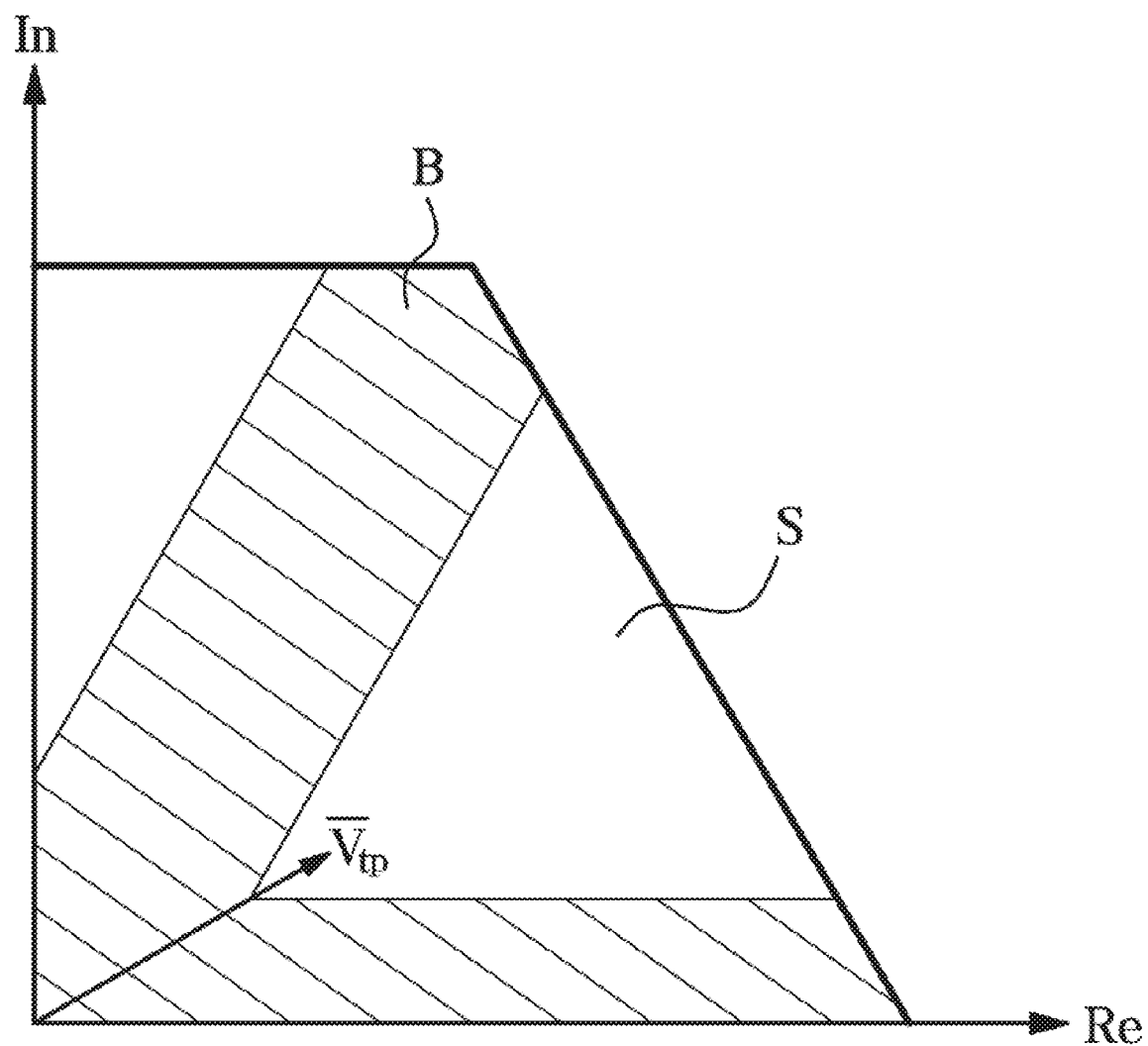
FIGS. 7 and 8 are views for describing a case in which a three-phase voltage vector of a compressor control apparatus has a phase of 30° according to an embodiment.
Figure 8:
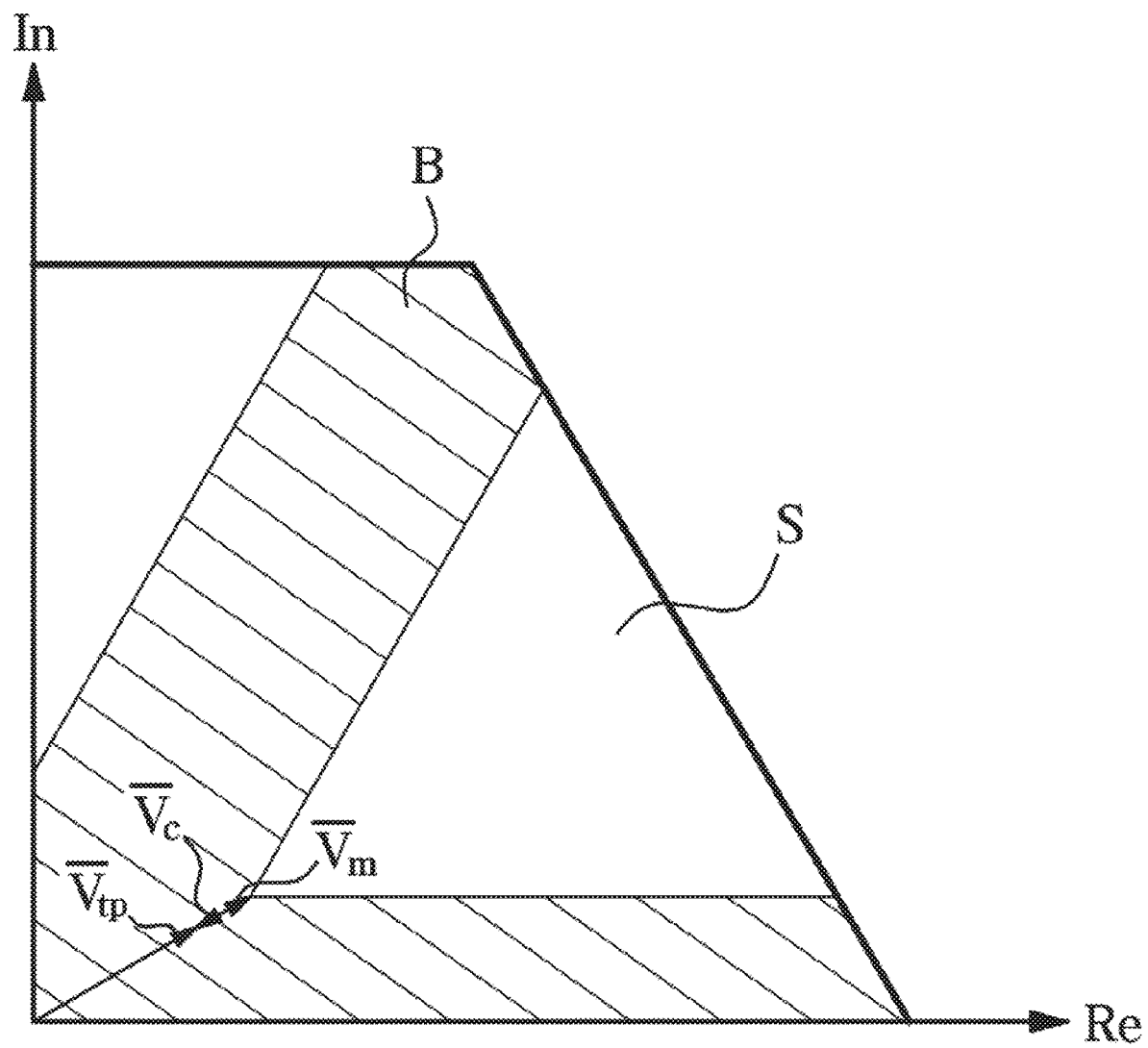

FIGS. 7 and 8 are views for describing a case in which a three-phase voltage vector of a compressor control apparatus has a phase of 30° according to an embodiment.

Referring to FIG. 7, when the three-phase voltage vector Vtp has the phase of 30°, it is possible to enter the current detectable area S with a size of the minimum three-phase voltage vector Vtp. For convenience of description, the case where the phase of the three-phase voltage vector is 30° will be described, but the case where the phase of the three-phase voltage vector is (30+60m)° (m is the integer) will also be understood.

When the three-phase voltage vector Vtp has the phase of 30°, the sum of the duty ratio differences of each phase is maximized, so that the time for current detecting may be easily secured. For example, the controller 150 may determine the duty ratio of the PWM signal applied to the first phase switching element U1 to be about 50%, the duty ratio of the PWM signal applied to the second phase switching element V1 to be about 35%, and the duty ratio of the PWM signal applied to the third phase switching element W1 to be about 65% so that the three-phase voltage vector Vtp has the phase of 30°.

That is, when the phase of the three-phase voltage vector Vtp is 30°, the duty ratio of the PWM signal applied to the first phase switching element U1, the duty ratio of the PWM signal applied to the second phase switching element V1 and the duty ratio of the PWM signal applied to the third phase switching element W1 may have a certain difference.

Therefore, as illustrated in FIG. 7, when the phase of the three-phase voltage vector Vtp is 30° and the size of the three-phase voltage vector Vtp is larger than a predetermined size, it is possible to enter the current detectable area S without much control. That is, in this case, according to the duty ratio difference of each PWM signal, within one period, only the third phase switching element W1 is turned on, the first phase switching element U1 and the third phase switching element W1 are turned on, and all of the first phase switching element U1 to the third phase switching element W1 are turned on.

Also, the state in which only the third phase switching element W1 is turned on may be maintained for a sufficient time to detect the current, and the state in which the first phase switching element W1 and the third phase switching element W1 are turned on may also be maintained for the sufficient time to detect the current. Therefore, the controller 150 may determine the first phase current, the second phase current, and the third phase current, respectively, based on the sum of the currents detected by the current detector 140 in each state. That is, the controller 150 may determine the current flowing in each phase based on the sum of the current detected from the current detector 140 and the duty ratio of the PWM signal applied to each of the plurality of switching elements U1, V1, W1, U2, V2, and W2.

However, referring to FIG. 8, even when the three-phase voltage vector Vtp has the phase of 30°, when the size of the three-phase voltage vector Vtp is less than or equal to the predetermined size, the three-phase voltage vector Vtp is located within the current undetectable area B. That is, when the three-phase voltage vector Vtp has the phase of 30°, the sum of the duty ratio difference of each phase is greater than when the three-phase voltage vector has a phase other than (30+60m)° (m is the integer). However, when the duty ratio difference of each phase is absolutely small, that is, when the size of the three-phase voltage vector is less than or equal to the predetermined size, the sufficient time for current detecting may not be secured.

For example, the controller 150 may determine the duty ratio of the PWM signal applied to the first phase switching element U1 to be about 50%, the duty ratio of the PWM signal applied to the second phase switching element V1 to be about 45%, and the duty ratio of the PWM signal applied to the third phase switching element W1 to be about 55% so that the three-phase voltage vector Vtp has the phase of 30°. In this case, according to the duty ratio difference of each PWM signal, within one period, only the third phase switching element W1 is turned on, the first phase switching element U1 and the third phase switching element W1 are turned on, and all of the first phase switching element U1 to the third phase switching element W1 are turned on.

However, since the state in which only the third phase switching element W1 is turned on is maintained for an insufficient time to detect the current, and the state in which the first phase switching element U1 and the third phase switching element W1 are turned on may also be maintained for the insufficient time to detect, the controller 150 may not determine the first phase current, the second phase current, and the third phase current, respectively, based on the sum of the currents detected from the current detector 140 in each state.

Therefore, the controller 150 may add the voltage vector Vm having the phase of 30° equal to the phase of the three-phase voltage vector Vtp to detect the current. That is, the controller 150 may maintain the duty ratio of the PWM signal applied to the first phase switching element U1 at about 50%, decrease the pulse width so that the duty ratio of the PWM signal applied to the second phase switching element V1 is about 40%, and increase the pulse width so that the duty ratio of the PWM signal applied to the third phase switching element W1 is about 60%. When the pulse width difference of the PWM signal applied to each phase increases by adding the voltage vector Vm in this way, since the state in which only the third phase switching element W1 is turned on may be maintained for the sufficient time to detect the current, and the first phase switching element U1 and the third phase switching element W1 are turned on may also be maintained for the sufficient time to detect the current, the controller 150 may determine the first phase current, the second phase current, and the third phase current, respectively, based on the sum of the currents detected from the current detector 140 in each state.

For example, the controller 150 may decrease the pulse width of the PWM signal applied to the second phase switching element V1 every odd numbered period, such as the first period, the third period, and the fifth period, and may increase the pulse width of the PWM signal applied to the third phase switching element W1.

That is, the controller 150 may determine the duty ratio of the PWM signal applied to each of the plurality of switching elements U1, V1, W1, U2, V2, and W2 so that the three-phase voltage vector Vtp has the phase of (30+60m)° (m is the integer). When the size of the three-phase voltage vector Vtp is equal to or less than the predetermined size, the controller 150 may add the voltage vector Vm having the phase of (30+60m)° to the three-phase voltage vector Vtp by changing the pulse width of the PWM signal applied to each of the plurality of switching elements U1, V1, W1, U2, V2, and W2 every predetermined period.

When the voltage vector Vm having the phase of (30+60m)° is added to the three-phase voltage vector Vtp, an average voltage value of the PWM signal applied to each of the switching elements U1, V1, W1, U2, V2, and W2 may be changed. Therefore, the controller 150 may add the voltage vector Vm having the phase of (30+60m)° to the three-phase voltage vector Vtp by changing the pulse width of the PWM signal in the next period of the predetermined period so that the output of the PWM signal applied to each of the switching elements U1, V1, W1, U2, V2, and W2 is maintained.

Hereinafter, the flow of current will be described with reference to FIGS. 9 and 10 when the three-phase voltage vector has the phase of (30+60m)°.

Figure 9:
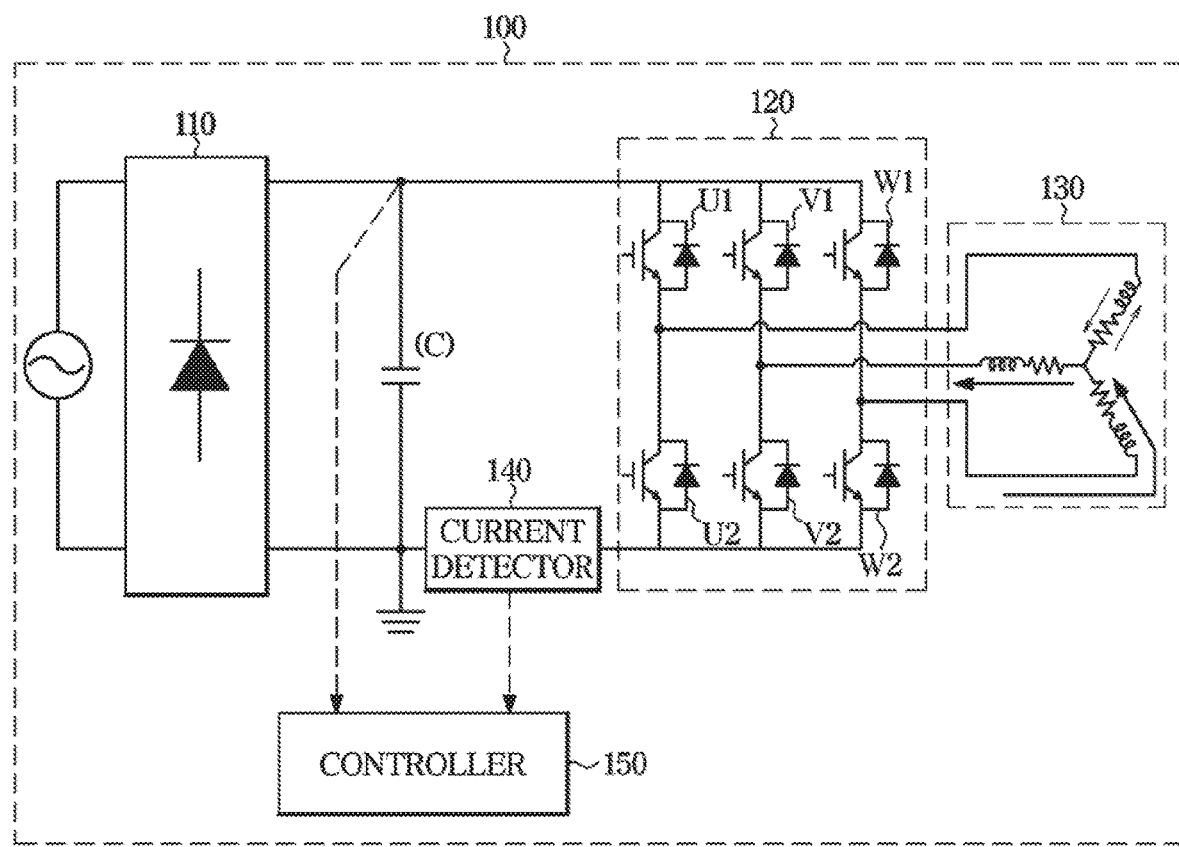
FIGS. 9 and 10 are views for describing a direction of a current flowing in a winding of a compressor control apparatus according to an embodiment.
Figure 10:
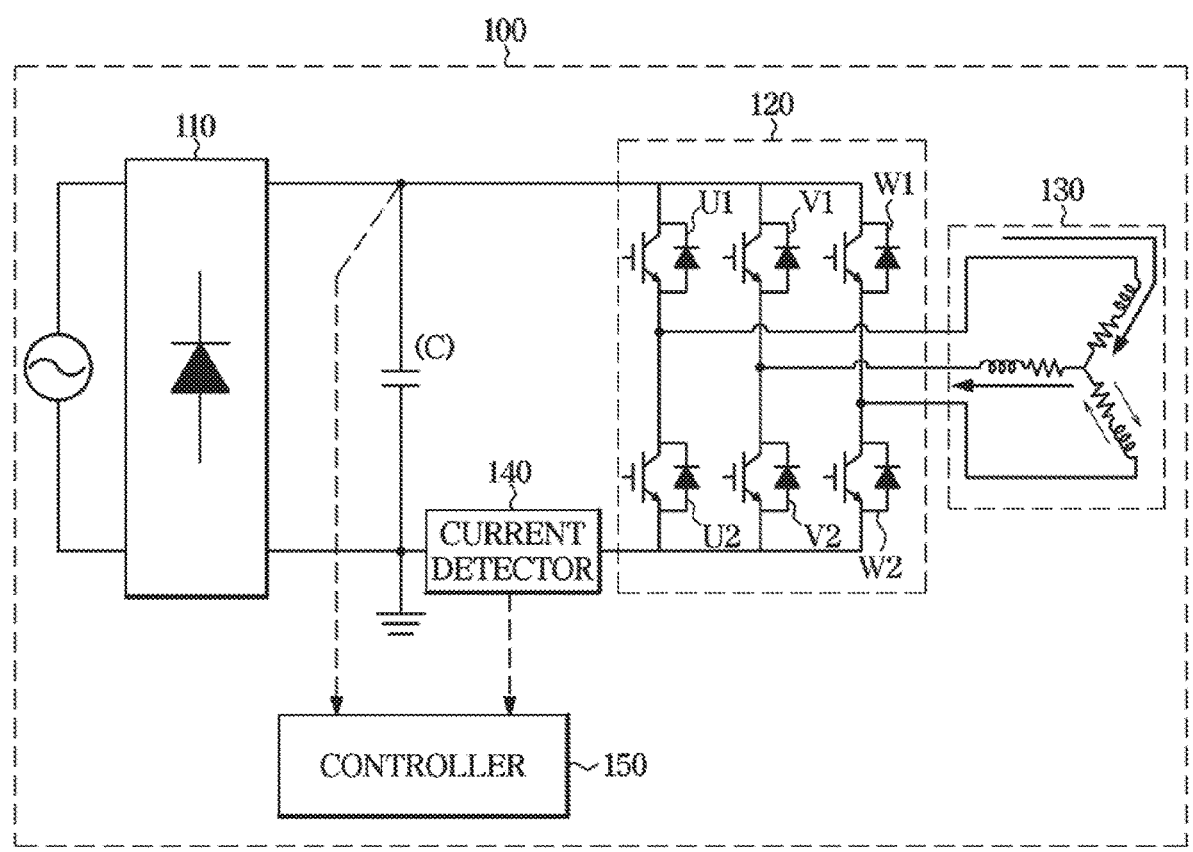

FIGS. 9 and 10 are views for describing a direction of a current flowing in a winding of a compressor control apparatus according to an embodiment. Particularly, FIG. 9 illustrates the flow of current when the phase of the three-phase voltage vector is 30°, and FIG. 10 illustrates the flow of current when the phase of the three-phase voltage vector is 90°.

Referring to FIG. 9, when the phase of the three-phase voltage vector is 30°, the current mainly flows from the W-phase to the V-phase. For example, the first phase switching element U1 may be turned on with the duty ratio of about 50%, the second phase switching element V1 may be turned on with the duty ratio of about 40%, and the third phase switching element W1 may be turned on with the duty ratio of about 60%.

Therefore, the current flowing to the lower switching element V2 included in the second phase switching elements through the upper switching element U1 included in the first phase switching elements and the current flowing to the lower switching element U2 included in the first phase switching elements through the upper switching element W1 included in the third phase switching elements may cancel each other. That is, the main current may flow to the lower switching element V2 included in the second phase switching elements through the upper switching element W1 included in the third phase switching elements.

That is, when the controller 150 determines the duty ratio of the PWM signal applied to the plurality of switching elements U1, V1, W1, U2, V2, and W2 so that the three-phase voltage vector has the phase of 30°, heat may be mainly generated in the two-phase and three-phase windings. At this time, since the size of the heat generated corresponds to a value obtained by multiplying a resistance value of the winding by the square of the current, the heat having a larger size may be generated than when the current flows through all of the three-phase windings of the motor 130.

For example, when the current flows through all of the three-phase windings, assuming that the first phase current is 2 A, the second phase current is 1 A, and the third phase current is 1 A, and assuming that the resistance value included in each of the windings is constant, the sum of the size of the heat generated in each of the windings has a ratio of 6. However, when the current flows only in the two-phase winding, the second phase current may be 2 A, and the third phase current may be 2 A. In this case, the sum of the size of the heat generated in each of the windings may have a ratio of 8. Thus, according to the embodiment of the disclosure, there is an effect that the amount of heat generated increases.

However, in the above case, since the heat is mainly generated only in the two-phase and three-phase windings, winding deterioration may occur. Therefore, in order to prevent winding deterioration, the controller 150 may change the duty ratio of the PWM signal applied to each of the plurality of switching elements U1, V1, W1, U2, V2, and W2 to change the direction of the current flowing through each winding. This will be described later with reference to FIG. 11.

Referring to FIG. 10, when the phase of the three-phase voltage vector is 90°, the current mainly flows from the W-phase to the V-phase. For example, the first phase switching element U1 may be turned on with the duty ratio of about 60%, the second phase switching element V1 may be turned on with the duty ratio of about 40%, and the third phase switching element W1 may be turned on with the duty ratio of about 50%.

Therefore, the current flowing to the lower switching element V2 included in the second phase switching elements through the upper switching element V1 included in the third phase switching elements and the current flowing to the lower switching element W2 included in the third phase switching elements through the upper switching element U1 included in the first phase switching elements may cancel each other. That is, the main current may flow to the lower switching element V2 included in the second phase switching elements through the upper switching element U1 included in the first phase switching elements.

In the above case, since the heat is mainly generated only in the two-phase and three-phase windings, winding deterioration may occur.

Hereinafter, an embodiment will be described with reference to FIG. 11 that the controller 150 changes the duty ratio of the PWM signal to change the direction of the current flowing through each winding.

Figure 11:
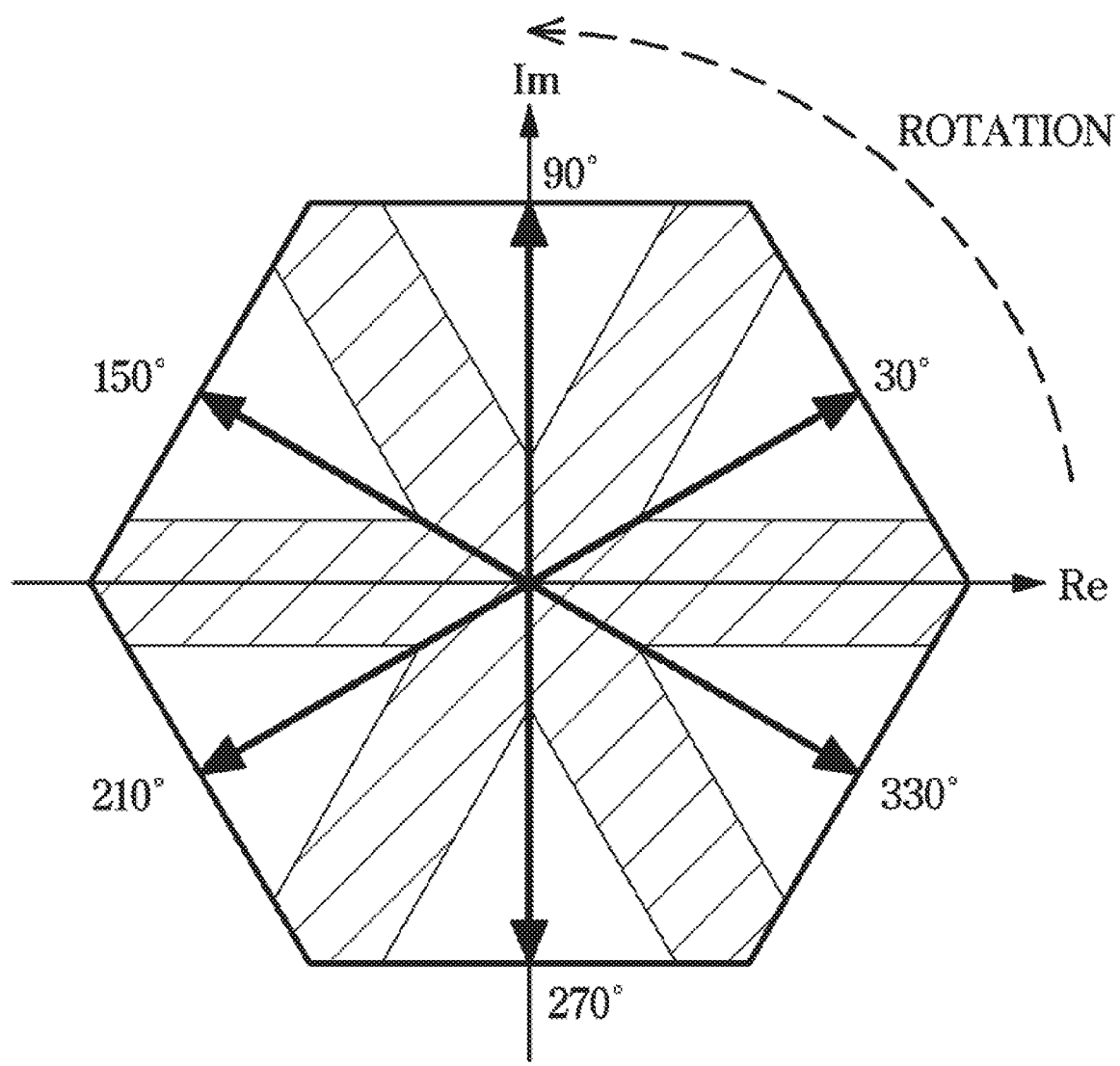
FIG. 11 is a view for describing that a three-phase voltage vector of a compressor control apparatus changes according to a predetermined time according to an embodiment.

FIG. 11 is a view for describing that a three-phase voltage vector of a compressor control apparatus changes according to a predetermined time according to an embodiment.

Referring to FIG. 11, the controller 150 may determine the duty ratio of the PWM signal applied to each of the plurality of switching elements U1, V1, W1, U2, V2, and W2 so that the three-phase voltage vector has the phase of (30+60m)° (m is the integer). As described with reference to FIGS. 9 and 10, when the integer m is constant, that is, when the winding through which the main current flows is constant, winding deterioration may occur.

Accordingly, the controller 150 may change the integer m by changing the duty ratio of the PWM signal applied to each of the plurality of switching elements U1, V1, W1, U2, V2, and W2 according to the predetermined time. Particularly, when the controller 150 determines the duty ratio of the PWM signal applied to each of the plurality of switching elements U1, V1, W1, U2, V2, and W2 so that the three-phase voltage vector has the phase of 30°, after the predetermined time, the controller 150 may change the duty ratio of the PWM signal applied to each of the plurality of switching elements U1, V1, W1, U2, V2, and W2 so that the three-phase voltage vector has the phase of 90°.

In addition, after the predetermined time, the controller 150 may change the duty ratio of the PWM signal applied to each of the plurality of switching elements U1, V1, W1, U2, V2, and W2 so that the three-phase voltage vector has a phase of 150°.

For example, the controller 150 may determine the duty ratio of the PWM signal applied to each of the plurality of switching elements U1, V1, W1, U2, V2, and W2 so that the three-phase voltage vector has the phase of 30°, and may change the duty ratio of the PWM signal applied to each of the plurality of switching elements U1, V1, W1, U2, V2, and W2 so that the three-phase voltage vector is 90°, 150°, 210°, 270°, and 330° every 5 seconds.

That is, by changing the phase of the three-phase voltage vector according to the predetermined time, the controller 150 may change the winding through which the main current flows to prevent winding deterioration.

Figure 12:
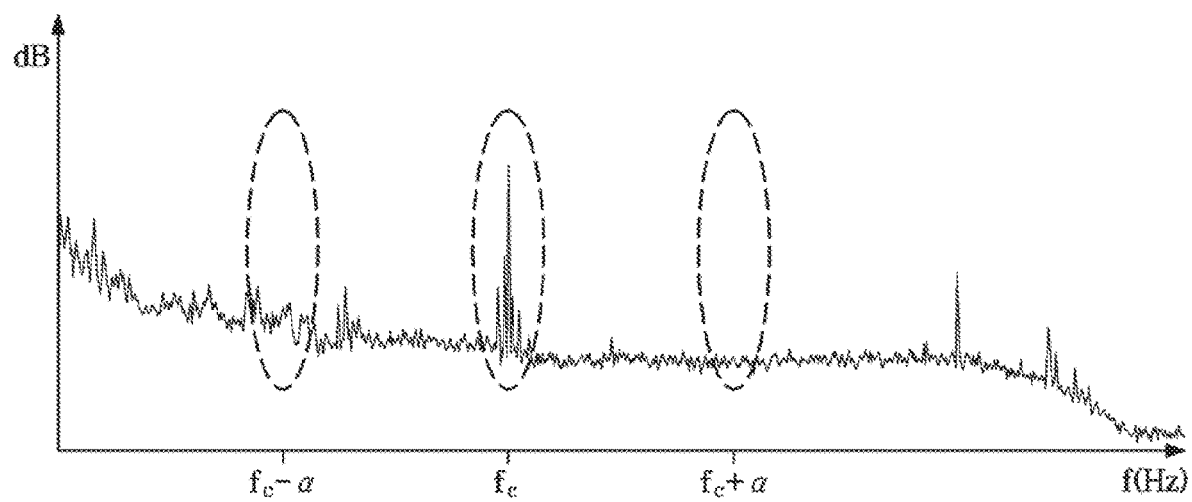
FIG. 12 is a view illustrating noise versus frequency of a compressor control apparatus according to an embodiment.

FIG. 12 is a view illustrating noise versus frequency of a compressor control apparatus according to an embodiment.

Referring to FIG. 12, a signal sound may be generated only near the carrier frequency fc of the PWM signal determined by the controller 150. It may be seen that noise does not occur in the vicinity of the frequency fc+a, which is as large as the certain value, with respect to the carrier frequency fc or in the vicinity of the frequency fc−a, which is as small as the certain value, with respect to the carrier frequency fc.

That is, according to the compressor control apparatus 100, it is possible to reduce noise by generating only the signal sound equal to the carrier frequency of the PWM signal and suppressing high-frequency noise.

Figure 13:
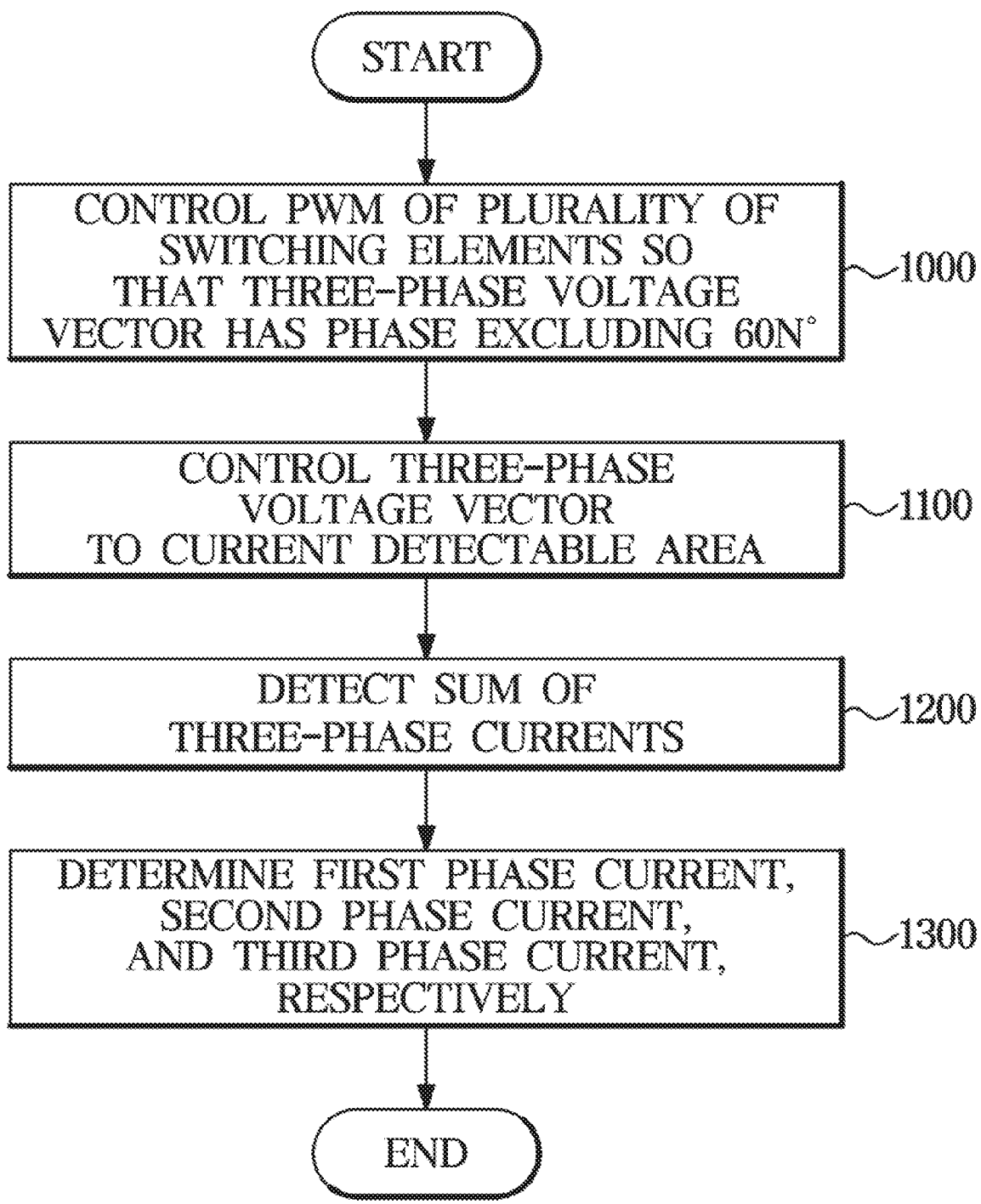
FIG. 13 is a flowchart illustrating a method of controlling a compressor according to an embodiment.

Hereinafter, a compressor control method according to the embodiment will be described with reference to FIG. 13. FIG. 13 is a flowchart illustrating a method of controlling a compressor according to an embodiment.

Referring to FIG. 13, the compressor control method may include controlling the PWM signal of the plurality of switching elements U1, V1, W1, U2, V2, and W2 so that the three-phase voltage vector has the phase excluding 60n° (1000). That is, the controller 150 may determine the duty ratios of the PWM signal applied to each of the plurality of switching elements U1, V1, W1, U2, V2, and W2 differently.

At this time, determining the duty ratio of the PWM signal applied to each of the plurality of switching elements differently, may include determining the duty ratio of the PWM signal applied to each of the plurality of switching elements U1, V1, W1, U2, V2, and W2 so that the three-phase voltage vector has the phase of (30+60m)° (m is the integer).

Thereafter, in the compressor control method, the controller 150 may control the three-phase voltage vector to the current detectable area (1300). Particularly, controlling the three-phase voltage vector to the current detectable area (1100) may include advancing or delaying the PWM signal applied to the first phase switching element U1 by the predetermined time within the predetermined period when the duty ratio of the PWM signal applied to the first phase switching element U1 is greater than or less than the duty ratio of the PWM signal applied to each of the second phase switching element V1 and the third phase switching element W1.

At this time, within the next period of the predetermined period, it may further include delaying or advancing the PWM signal applied to the first phase switching element U1 by the predetermined time.

In addition, controlling the three-phase voltage vector with the current detectable area (1100) may include adding the voltage vector having the phase of $(30+60m)°$ in the three-phase voltage vector by changing the pulse width of the PWM signal applied to each of the plurality of switching elements U1, V1, W1, U2, V2, and W2 at the predetermined period when the three-phase voltage vector has the phase of $(30+60m)°$ (m is the integer) and the size of the three-phase voltage vector is less than the predetermined size.

At this time, it may further include adding the voltage vector having the phase of $(-30-60\text{ m})°$ to the three-phase voltage vector by changing the pulse width of the PWM signal applied to each of the plurality of switching elements U1, V1, W1, U2, V2, and W2 in the next period of the predetermined period.

In the compressor control method, the current detector 140 may detect the sum of the first phase current, the second phase current, and the third phase current supplied to the motor 130 afterwards (1200).

Thereafter, in the compressor control method, the controller 150 may determine the first phase current, the second phase current, and the third phase current, respectively, based on the determined duty ratio and the detected sum of the currents (1300).

Also, although not illustrated in the drawing, the compressor control method may further include changing the integer m by changing the duty ratio of the PWM signal applied to each of the plurality of switching elements U1, V1, W1, U2, V2, and W2 according to the predetermined time when the three-phase voltage vector has the phase of $(30+60m)°$ (m is the integer).

Each of operations 1000, 1100, 1200, and 1300 is arranged in any order for convenience of description. It is of course that the common person(s) can be adopted in an easily changeable order.

According to the apparatus and the method of controlling the compressor, and the air conditioner including the same according to an aspect, high-frequency noise generated during heating of the winding can be suppressed, and deterioration of the winding or the switching element can be prevented during the heating of the winding.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A compressor control apparatus comprising:
   a rectifier configured to rectify AC power to DC power;
   an inverter including a plurality of switching elements, configured to convert the DC power into a three-phase voltage according to a pulse width modulation (PWM) signal applied to the plurality of switching elements;
   a motor configured to receive a three-phase current including a first phase current, a second phase current, and a third phase current based on the three-phase voltage;
   a current detector configured to detect a sum of the first phase current, the second phase current, and the third phase current; and
   a controller configured to
      differently determine a duty ratio of the PWM signal applied to each of the plurality of switching elements, and
      determine the first phase current, the second phase current, and the third phase current, respectively, based on the determined duty ratio and the sum of the first phase current, the second phase current, and the third phase current detected by the current detector.

2. The compressor control apparatus according to claim 1, wherein the controller is configured to determine the duty ratio of the PWM signal applied to each of the plurality of switching elements so that a vector of the three-phase voltage has a phase of $(30+60m)°$ (m is an integer).

3. The compressor control apparatus according to claim 2, wherein the controller is configured to change the integer m by changing the duty ratio of the PWM signal applied to each of the plurality of switching elements according to a predetermined time.

4. The compressor control apparatus according to claim 2, wherein, when a size of the vector of the three-phase voltage is less than or equal to a predetermined size, the controller is configured to change a pulse width of the PWM signal applied to each of the plurality of switching elements every predetermined period to add a voltage vector having a phase of $(30+60m)°$ to the vector of the three-phase voltage.

5. The compressor control apparatus according to claim 4, wherein the controller is configured to change the pulse width of the PWM signal applied to each of the plurality of switching elements to add a voltage vector having a phase of $(-30-60m)°$ to the vector of the three-phase voltage in a next period of the predetermined period.

6. The compressor control apparatus according to claim 1, wherein
   the plurality of switching elements comprises a first phase switching element through which the first phase current can flow, a second phase switching element through which the second phase current can flow, and a third phase switching element through which the third phase current can flow, and, when the duty ratio of the PWM signal applied to the first phase switching element is greater than or less than the duty ratio of the PWM signal applied to each of the second phase switching element and the third phase switching element, the controller is configured to advance or delay the PWM signal applied to the first phase switching element by a predetermined time within a predetermined period.

7. The compressor control apparatus according to claim 6, wherein the controller is configured to delay or advance the PWM signal applied to the first phase switching element within a next period of the predetermined period by the predetermined time.

8. A method of controlling a compressor including a current detector connected to a plurality of switching elements, the method comprising:
converting DC power into a three-phase voltage according to a pulse width modulation (PWM) signal applied to the plurality of switching elements,
providing, to a motor, a three-phase current including a first phase current, a second phase current, and a third phase current based on the three-phase voltage;
detecting a sum of the first phase current, the second phase current, and the third phase current;
differently determining a duty ratio of the PWM signal applied to each of the plurality of switching elements; and
determining the first phase current, the second phase current, and the third phase current, respectively, based on the determined duty ratio and the detected sum.

9. The method according to claim 8, wherein the determining of the duty ratio of the PWM signal applied to each of the plurality of switching elements differently comprises:
determining the duty ratio of the PWM signal applied to each of the plurality of switching elements so that a vector of the three-phase voltage has a phase of (30+60m)° (m is an integer).

10. The method according to claim 9, further comprising:
changing the integer m by changing the duty ratio of the PWM signal applied to each of the plurality of switching elements according to a predetermined time.

11. The method according to claim 9, further comprising:
when a size of the vector of the three-phase voltage is less than or equal to a predetermined size, changing a pulse width of the PWM signal applied to each of the plurality of switching elements every predetermined period to add a voltage vector having a phase of (30+60m)° to the vector of the three-phase voltage.

12. The method according to claim 11, further comprising:
changing the pulse width of the PWM signal applied to each of the plurality of switching elements to add a voltage vector having a phase of (−30−60m)° to the vector of the three-phase voltage in a next period of the predetermined period.

13. The method according to claim 8, further comprising:
when the duty ratio of the PWM signal applied to a first phase switching element is greater than or less than the duty ratio of the PWM signal applied to each of a second phase switching element and a third phase switching element, advancing or delaying the PWM signal applied to the first phase switching element by a predetermined time within a predetermined period.

14. The method according to claim 13, further comprising:
delaying or advancing the PWM signal applied to the first phase switching element within a next period of the predetermined period by the predetermined time.

15. An air conditioner comprising:
a rectifier configured to rectify AC power to DC power;
an inverter including a plurality of switching elements, configured to convert the DC power into a three-phase voltage according to a pulse width modulation (PWM) signal applied to the plurality of switching elements;
a motor configured to receive a three-phase current including a first phase current, a second phase current, and a third phase current based on the three-phase voltage;
a current detector configured to detect a sum of the first phase current, the second phase current, and the third phase current; and
a controller configured to
differently determine a duty ratio of the PWM signal applied to each of the plurality of switching elements, and
determine the first phase current, the second phase current, and the third phase current, respectively, based on the determined duty ratio and the sum of the first phase current, the second phase current, and the third phase current detected by the current detector.

16. The air conditioner according to claim 15, wherein the controller is configured to determine the duty ratio of the PWM signal applied to each of the plurality of switching elements so that a vector of the three-phase voltage has a phase of (30+60m)° (m is an integer).

17. The air conditioner according to claim 16, wherein the controller is configured to change the integer m by changing the duty ratio of the PWM signal applied to each of the plurality of switching elements according to a predetermined time.

18. The air conditioner according to claim 16, wherein, when a size of the vector of the three-phase voltage is less than or equal to a predetermined size, the controller is configured to change a pulse width of the PWM signal applied to each of the plurality of switching elements every predetermined period to add a voltage vector having a phase of (30+60m)° to the vector of the three-phase voltage.

19. The air conditioner according to claim 15, wherein
the plurality of switching elements comprises a first phase switching element through which the first phase current can flow, a second phase switching element through which the second phase current can flow, and a third phase switching element through which the third phase current can flow, and,
when the duty ratio of the PWM signal applied to the first phase switching element is greater than or less than the duty ratio of the PWM signal applied to each of the second phase switching element and the third phase switching element, the controller is configured to advance or delay the PWM signal applied to the first phase switching element by a predetermined time within a predetermined period.

20. The air conditioner according to claim 19, wherein the controller is configured to delay or advance the PWM signal applied to the first phase switching element within a next period of the predetermined period by the predetermined time.

* * * * *